March 17, 1936.  J. H. JALBERT  2,033,938
SHOCK ABSORBER FOR MOTOR AND OTHER VEHICLES
Original Filed May 1, 1929  5 Sheets-Sheet 1
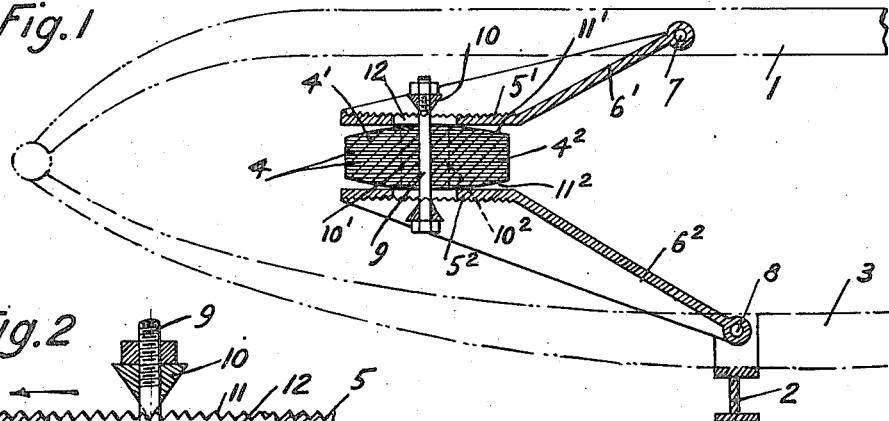
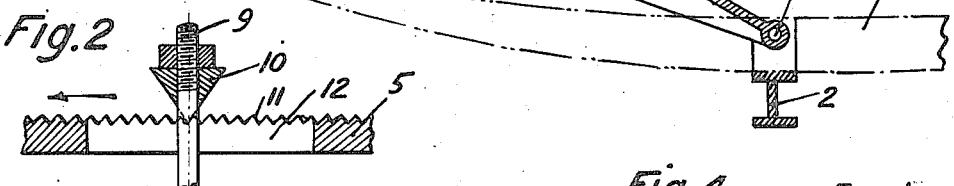
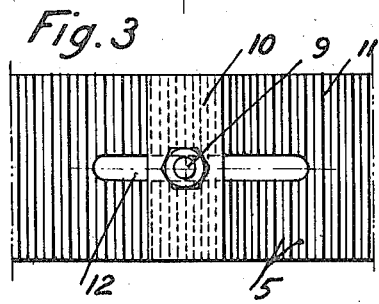
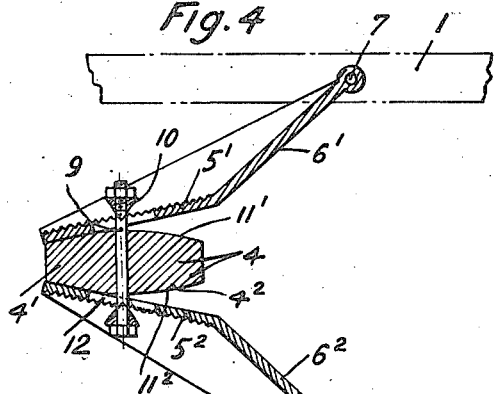
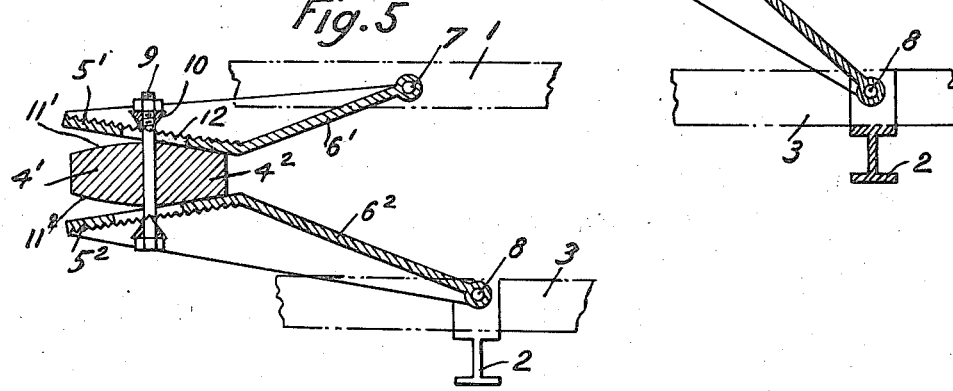
Jean Henry Jalbert
INVENTOR;
By
his Attorney

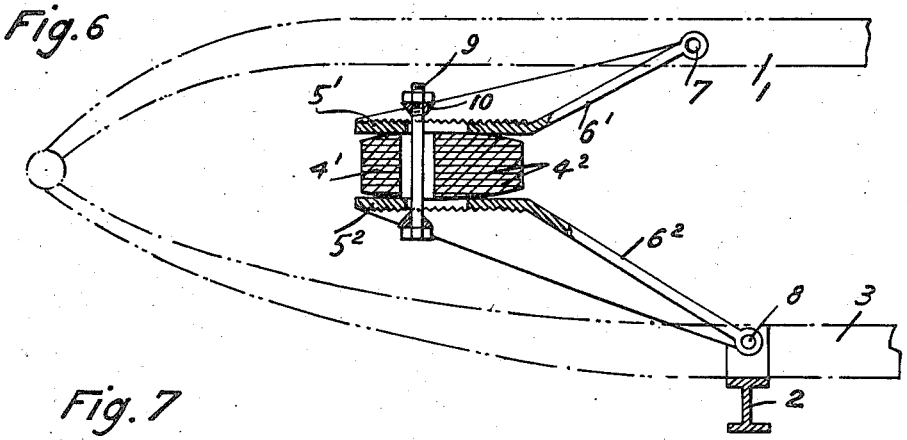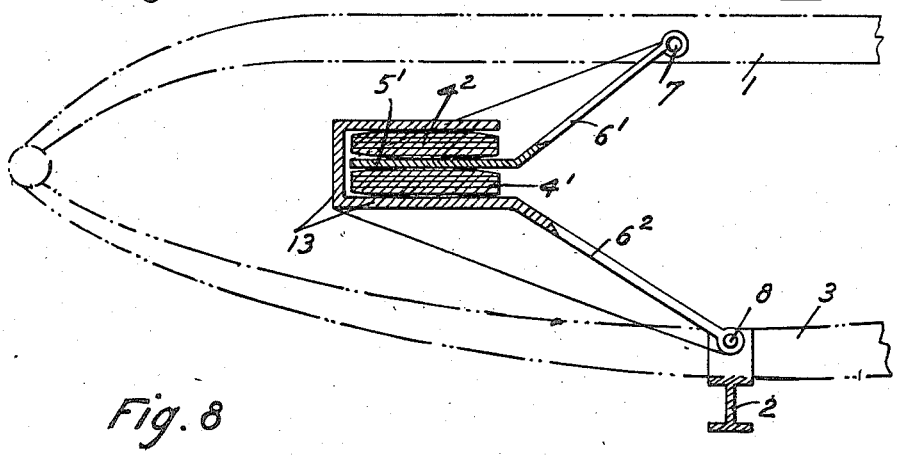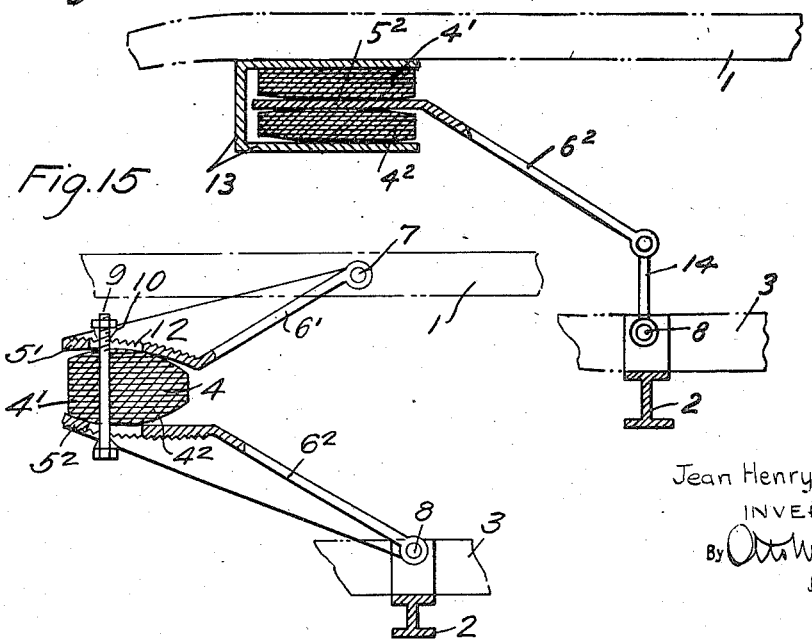

March 17, 1936. J. H. JALBERT 2,033,938
SHOCK ABSORBER FOR MOTOR AND OTHER VEHICLES
Original Filed May 1, 1929  5 Sheets-Sheet 3
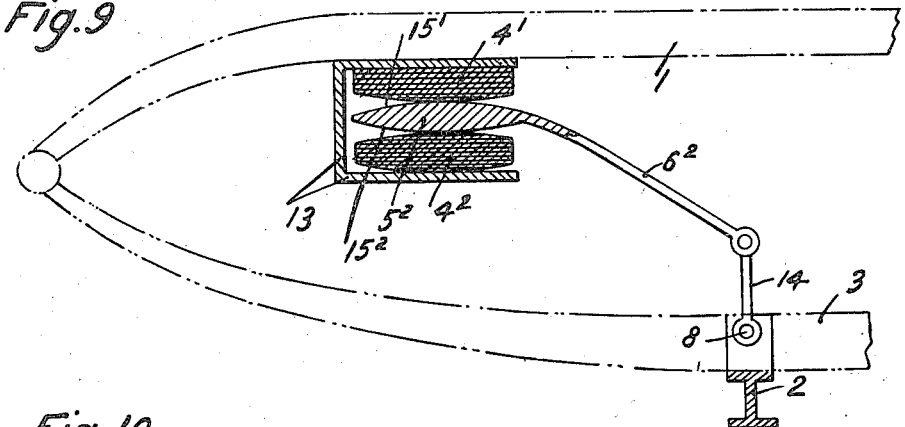
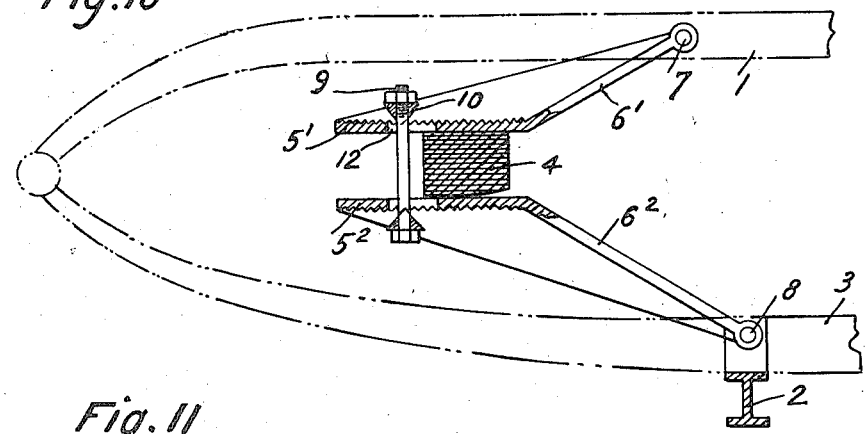
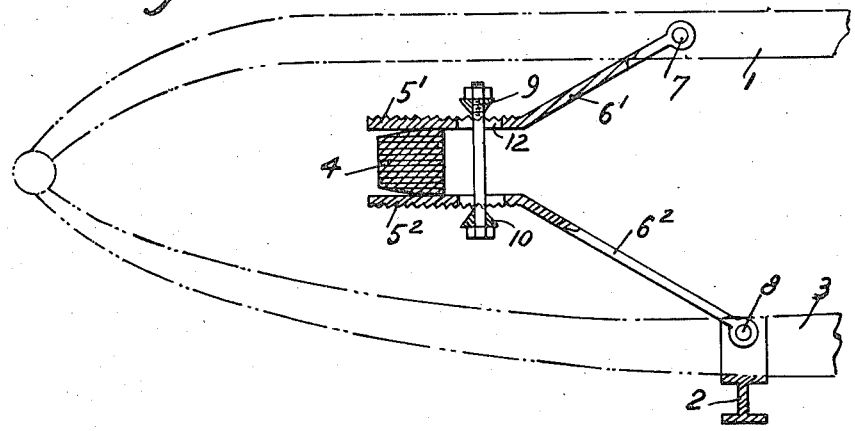
Jean Henry Jalbert
INVENTOR March 17, 1936.　　　　J. H. JALBERT　　　　2,033,938
SHOCK ABSORBER FOR MOTOR AND OTHER VEHICLES
Original Filed May 1, 1929　　5 Sheets-Sheet 4

Jean Henry Jalbert
INVENTOR:
By Otto Munk
his Attorney.

March 17, 1936.　　　J. H. JALBERT　　　2,033,938
SHOCK ABSORBER FOR MOTOR AND OTHER VEHICLES
Original Filed May 1, 1929　5 Sheets-Sheet 5

Jean Henry Jalbert
INVENTOR
By
his Attorney.

Patented Mar. 17, 1936

2,033,938

UNITED STATES PATENT OFFICE 2,033,938

SHOCK ABSORBER FOR MOTOR AND OTHER VEHICLES

Jean Henry Jalbert, Paris, France

Application May 1, 1929, Serial No. 359,553
Renewed October 6, 1933

21 Claims. (Cl. 267—21)

The present invention relates to improvements in shock absorbers for motor or other vehicles, whereby such devices will constantly operate in a reliable manner. Another feature of the invention consists in the construction of a shock absorber which corresponds to the requirements of each type of vehicle and whose resistance may be easily regulated for the various distances between the axles and the vehicle frame.

The said invention further affords a shock absorber which will correspond to establish curves for the damping action, and which offers a slight damping for the small oscillations of the vehicle frame without causing an excessive hardness of the spring suspension, and such absorbers allow a considerable latitude for the small oscillations, while at the same time offering a greater resistance to the large oscillations.

Another feature of the invention consists in the construction of a shock absorber providing for the ready variation of the rate of damping in the rise and descent of the vehicle frame, or in other words, the ascent can be but slightly impeded and the descent much impeded, or inversely, or the damping can be made equal in both cases.

The invention also provides a shock absorber which is unaffected by atmospheric conditions or by dust and mud; the apparatus is but little subject to wear, and it operates in a noiseless and responsive manner.

A shock absorber embodying the aforesaid advantages offers the characteristics which are specified in the following description and chiefly in the claims appended thereto.

Various shock absorbers according to the invention are shown by way of example in the accompanying drawings.

Fig. 1 is a partial lengthwise section of a motor vehicle provided with a shock absorber in conformity to the invention.

Fig. 2 is a section on a larger scale of a shoe pertaining to the apparatus shown in Fig. 1.

Fig. 3 is the corresponding plan view.

Figs. 4 and 5 are diagrammatic views of said apparatus in two different positions.

Figs. 6 to 15 are partial lengthwise sections of modified apparatus.

Figure 12:
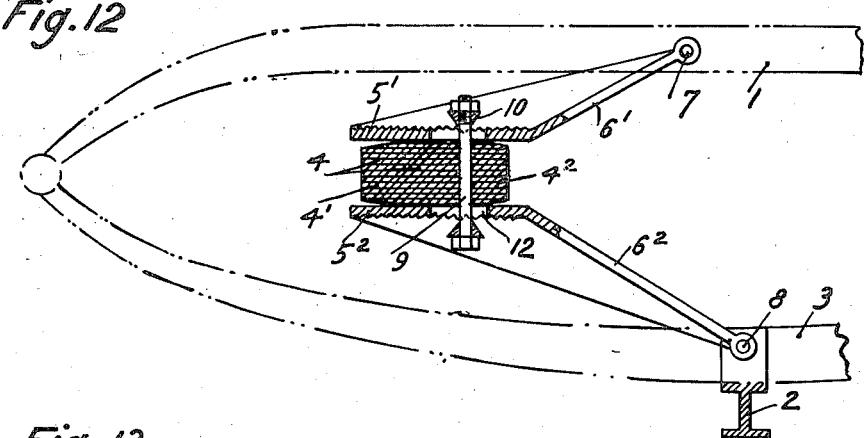

The motor vehicle shown in Figures 1 to 5 comprises a longitudinal beam 1 and a front axle 2, these being connected by the spring 3.

The shock absorber comprises a rubber block 4 held between two shoes $5^1$ $5^2$ mounted on two respective levers $6^1$ $6^2$, pivoted respectively at 7 to the vehicle frame 1 and to the front axle 2 at 8.

The shoes $5^1$ $5^2$ are secured to said rubber block 4 by a bolt 9, adjustably mounted on the two shoes $5^1$ $5^2$; said bolt is disposed in a guide 12 in said shoes, and it is engaged at each end in a knife-shaped cross-piece 10 resting by its edge on teeth 11 formed on the outer surface of the shoe.

The operation of the said shock-absorber is as follows.

The two levers $6^1$ $6^2$ follow the longitudinal beams 1 and the front axle 2 of the vehicle in their relative displacements, as shown in Figures 4 and 5, and hence the shoes $5^1$ $5^2$ will press alternately on the front part and the rear part of the rubber block 4, thus absorbing the oscillations of the vehicle frame 1 relatively to the front axle 2.

The shock absorber thus constructed offers numerous advantages. It has a simple construction, and thus cannot get out of order. The wear is reduced to a minimum, the internal work being represented by the stresses upon a solid deformable substance such as rubber.

The operation is noiseless and responsive, since the rubber block absorbs the oscillations of the vehicle frame 1 relatively to the axle 2, as well as all noise thus occasioned.

Furthermore, the said apparatus is but little subject to wear, since the rubber block 4, due to its internal work, absorbs the stresses due to the relative motion of the vehicle frame and axle. The operation of the said shock absorber is practically independent of the hygrometric state of the air, and of the action of dust, mud, or the like.

The action of the shock absorber varies according to the oscillations of the vehicle frame 1 relatively to the axle 2, and the mass of the block 4 acted upon by such oscillations will depend upon the amplitude of such oscillations. It will be observed in Figure 1 that for small oscillations of the vehicle frame 1 relatively to the axle 2, only the part of the rubber which is bounded by the planes $10^1$ $10^2$ is practically affected and reacts under the displacements of the vehicle frame 1 relatively to the axle 2, and hence there is produced only a slight damping for the small oscillations, the springs 3 preserving their freedom of action in a practically complete manner.

The said mass of rubber which is affected by the oscillations increases progressively according as the amplitude of such oscillations becomes greater. It will be observed chiefly in Figs. 4 and 5 that for large oscillations, one-half of the block is alternately actuated by the shoes $5^1$ $5^2$ and thus cooperates in the damping action in the direction of the separation of the vehicle frame from the axle (Fig. 4) and also when the said frame and axle come together (Fig. 5).

The rounded form given to the outer surfaces of said block $11^1$ $11^2$ permits a progressive variation of the amount of the rubber employed for the damping.

The said apparatus can be readily adjusted. The block 4 can be readily replaced by another block whose outer surfaces differ from those shown in Figure 4. A change in the outline of the surfaces $11^1$ $11^2$ will change the law of variation of the absorbing action of the apparatus.

With the use of a given absorbing block 4, it is possible to modify the damping action during the descent of the vehicle frame 1 and also during the ascent of the frame, and this is effected by displacing the bolt 9, which can be readily done by displacing the knife edge 10 upon the teeth 11 (Figs. 2 and 3). A displacement of the knife 10 according to $12^1$ will reduce the part $4^1$ of the damping which is operative during the ascent of the vehicle frame (Fig. 4), while at the same time this increases the part of the block which is operative during the descent of the vehicle frame (Fig. 5).

In this manner, the invention affords a very responsive apparatus which is adapted for use upon widely varying types of vehicles, and upon each vehicle the apparatus will follow a wide range of predetermined damping curves. With the said apparatus, it becomes an easy matter to vary the damping ratio between the rise and descent of the vehicle frame 1.

The apparatus is susceptible of numerous modifications, and for instance the single rubber block 4 may be replaced by two separate blocks $4^1$ $4^2$ (Fig. 6) which are held between the two shoes $5^1$ $5^2$, connected together by the bolt 9. This permits to move one block with reference to the other and thus to regulate the ratio between the damping on the ascent of the frame (abrupt action) and the damping on the descent of the frame.

The apparatus may further comprise (Fig. 7) a casing (13) secured to the lever $6^2$ pivoted at 8 to the vehicle axle 2; the lever $6^1$ is pivoted at 7 to the vehicle frame 1 and its shoe $5^1$ is engaged between two rubber blocks $4^1$ $4^2$ which operate according to the rise or descent of the vehicle frame. This eliminates all connecting bolts in the assembling of the rubber blocks and the levers $6^1$ $6^2$.

In the embodiment shown in Fig. 8, the rubber block $4^2$ is mounted directly below the vehicle frame 1. The shoe $5^2$ of the lever $6^2$ is engaged between the block $4^2$ and the block $4^1$ which is disposed in a casing 13 mounted on the vehicle frame 1. The lever $6^2$ is connected to the vehicle axle 2 by a link 14 pivoted at 8 to the said axle 2.

This construction has the advantage of eliminating one of the parts of the said casing which contains the rubber blocks.

In the construction shown in Figure 9, the shoe $5^2$ comprises two rounded external faces $15^1$ $15^2$, said shoe being as before engaged between the two rubber blocks $4^1$ $4^2$.

The rounded form of the said external faces $15^1$ $15^2$ provides for a gradual and progressive action of the shoe $5^2$ on the rubber blocks $4^1$ $4^2$, thus affording a progressive damping action.

In the preceding examples, the rubber block 4 is operative both on the rise and the descent of the vehicle frame, but it may be so disposed as to operate only on the rise or on the descent.

An apparatus of this nature is shown in Figure 10, which comprises a rubber block 4 mounted entirely in the rear of the bolt 9 and between the two shoes $5^1$ $5^2$, and hence the said block is inoperative when the vehicle frame descends.

On the contrary, in the apparatus shown in Figure 11, the rubber block 4 is disposed entirely in front of the bolt 9 and between the two shoes $5^1$ $5^2$, so that the said block is only operative when the vehicle frame rises, on which occasion the abrupt action is damped.

An arrangement which is intermediate between those of Figures 10 and 11 can be obtained by the use of a single rubber block 4 which is held between two shoes $5^1$ and $5^2$, the bolt 9 being so disposed that the block $4^1$ is much larger than the block $4^2$, whereby the apparatus will operate to a much greater degree when the vehicle frame rises (abrupt action) than when it descends.

In the preceding examples, the shoes $5^1$ $5^2$ have a flat surface, but other suitable surfaces may be employed for the shoes and also for the said rubber blocks, according to the shock-absorbing effects which are to be obtained.

Figure 13:
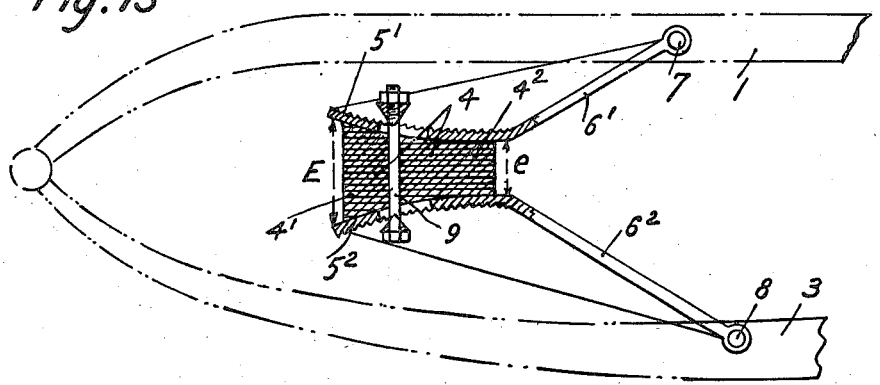

As an example, the Fig. 13 can be employed, and herein the shoes $5^1$ $5^2$ are convex. The thickness of said block will thus vary from $e$ to $E$ forwardly of the vehicle axle, and hence when the vehicle frame comes near the axle, the thickness of the rubber block held between the shoes $5^1$ $5^2$ will be but small, so that the hardness of the apparatus will rapidly increase as the vehicle frame descends.

On the contrary, in the case in which the vehicle frame 1 is separated from the axle 2, a mass of rubber $E$ of considerable thickness will be held between the shoes $5^1$ $5^2$, thus providing for a great damping action without excessive hardness.

Figure 14:
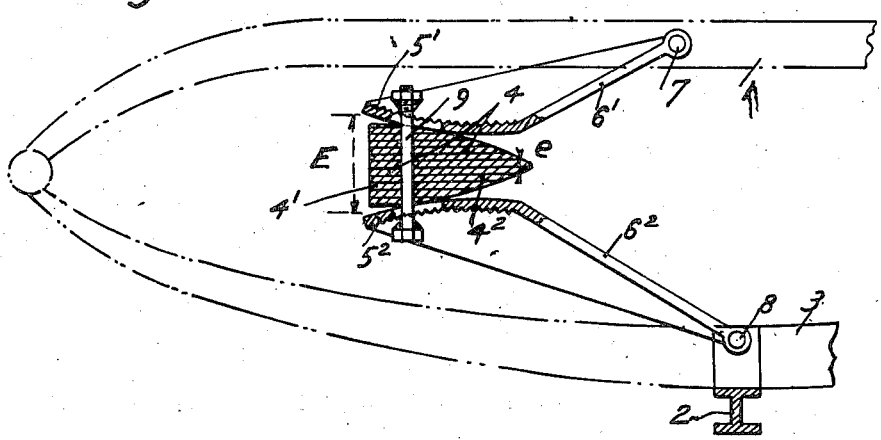

The apparatus shown in Figure 14 has the same general features as the one shown in Figure 13, with added arrangements. The rubber block 4 ends in a very thin point $e$, and this affords an apparatus which rapidly increases in hardness during the descent of the vehicle frame 1.

Figure 15:
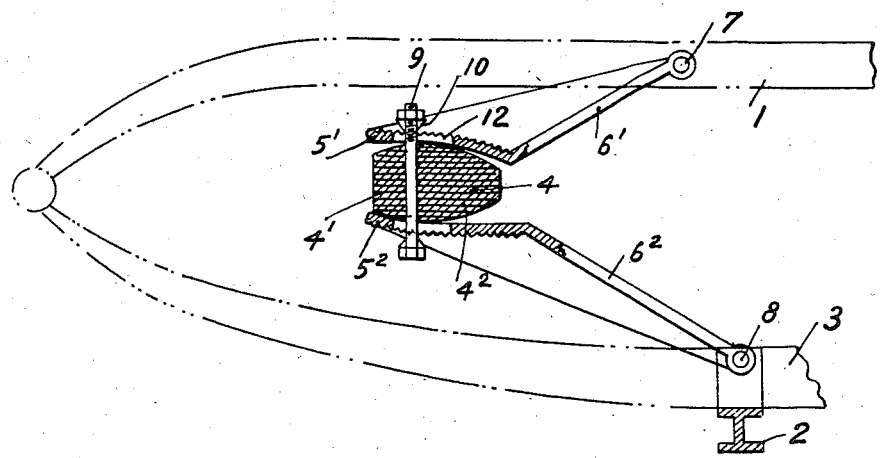

Fig. 15 shows another construction in which the rubber block 4 as well as the levers $6^1$ $6^2$ and their respective shoes $5^1$ $5^2$ have a disymmetrical arrangement, thus only slightly damping the small oscillations, then rapidly increasing in hardness, and finally affording a damping action which remains practically constant within wide limits of oscillation. It is observed in fact that the part of the rubber which is actually held between the shoes $5^1$ $5^2$ and which is active in absorbing the shocks, will vary in the first place to a slight degree, then rapidly increases, and will finally vary within small limits for the large oscillations of the levers $6^1$ $6^2$.

To recapitulate, the invention affords a shock absorber which is adapted for use upon a great variety of vehicles, and which will follow predetermined damping curves of a greatly varied nature. The damping action can in fact be modified by a suitable choice of the outline of the rubber block 4 and of the shoes $5^1$ $5^2$, and of the position of the parts 9 connecting said blocks and shoes, and of all suitable factors of the rubber block which operate according to the direction of movement of the vehicle frame 1.

What is claimed is:

1. In combination with a vehicle frame and axle, a shock absorber comprising a pair of levers, each pivoted at one end thereof to the frame and axle respectively, a resilient member interposed between the free ends of the levers, and means for holding said free ends and said resilient member in cooperative relation; whereby the levers at their pivoted ends follow the relative displacements of the frame and axle and at their free ends they alternately compress spaced portions of the interposed resilient member to cause the oscillations of the frame relatively to the axle to be absorbed by said resilient member.

2. In combination with a vehicle frame and axle, a shock absorber comprising a pair of levers, each pivoted at one end thereof to the frame and axle respectively, a resilient member of varying cross-section interposed between the free ends of the levers, and means for holding said free ends and said resilient member in cooperative relation; whereby the levers at their pivoted ends follow the relative displacements of the frame and axle and at their free ends they alternately compress spaced portions of the interposed resilient member to cause the oscillations of the frame relatively to the axle to be absorbed by said resilient member.

3. In combination with a vehicle frame and axle, a shock absorber comprising a pair of levers, each pivoted at one end thereof to the frame and axle respectively, the free ends of said levers being normally disposed in substantially parallel relation, a resilient member interposed between said free ends, and means for holding said free ends and said resilient member in cooperative relation; whereby the levers at their pivoted ends follow the relative displacements of the frame and axle and at their free ends they alternately compress spaced portions of the interposed resilient member to cause the oscillations of the frame relatively to the axle to be absorbed by said resilient member.

4. In combination with a vehicle frame and axle, a shock absorber comprising a pair of levers, each pivoted at one end thereof to the frame and axle respectively, means for adjustably retaining the free ends of said levers in predetermined relation, and a resilient member interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

5. In combination with a vehicle frame and axle, a shock absorber comprising a pair of levers, each pivoted at one end thereof to the frame and axle respectively, means for adjustably retaining the free ends of said levers in predetermined relation, and a resilient member of varying cross-section interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

6. In combination with a vehicle frame and axle, a shock absorber comprising a pair of levers, each pivoted at one end thereof to the frame and axle respectively, the free ends of said levers being normally disposed in substantially parallel relation, a resilient member of varying cross-section interposed between said free ends, and means for holding said free ends and said member is cooperative relation; whereby the levers at their pivoted ends follow the relative displacements of the frame and axle and at their free ends they alternately compress spaced portions of the interposed resilient member to cause the oscillations of the frame relatively to the axle to be absorbed by said resilient member.

7. In combination with a vehicle frame and axle, a shock absorber comprising a pair of levers, each pivoted at one end thereof to the frame and axle respectively, the free ends of said levers being apertured, a bolt passing through said apertured ends and having means thereon for holding said free ends in predetermined spaced relation, and a resilient member interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

8. In combination with a vehicle frame and axle, a shock absorber comprising a pair of levers, each pivoted at one end thereof to the frame and axle respectively, the free ends of said levers being apertured and having serrated outer faces, a bolt passing through said apertured ends, a block at each end of said bolt cooperating with said serrated faces, and a resilient member interposed between said free ends.

9. In combination with a vehicle frame and axle, a shock absorber comprising a pair of levers, each pivoted at one end thereof to the frame and axle respectively, the free ends of said levers being apertured, a resilient member interposed between said free ends, and a bolt passing through said apertured ends and said resilient member, said bolt having means thereon for holding said free ends in predetermined spaced relation to clamp said member therebetween; whereby the levers at their pivoted ends follow the relative displacements of the frame and axle and at their free ends they alternately compress spaced portions of the interposed resilient member to cause the oscillations of the frame relatively to the axle to be absorbed by said resilient member.

10. In combination with a vehicle frame and axle, a shock absorber comprising a pair of levers, each pivoted at one end thereof to the frame and axle respectively, a resilient member having convex faces interposed between the free ends of the levers, and means for holding said free ends and said resilient member in cooperative relation; whereby the levers at their pivoted ends follow the relative displacements of the frame and axle and at their free ends they alternately compress spaced portions of the interposed resilient member to cause the oscillations of the frame relatively to the axle to be absorbed by said resilient member.

11. In combination with a vehicle frame and axle, a shock absorber comprising a pair of levers, each pivoted at one end thereof to the frame and axle respectively, the free ends of said levers being apertured, a resilient member having convex faces interposed between said free ends, and a bolt passing through said apertured ends and said resilient member, said bolt having means thereon for holding said free ends in predetermined spaced relation to clamp said member therebetween; whereby the levers at their pivoted ends follow the relative displacements of the frame and axle and at their free ends they alternately compress spaced portions of the interposed resilient member to cause the oscillations of the frame relatively to the axle to be absorbed by said resilient member.

12. In combination with a vehicle frame and axle, a shock absorber comprising a pair of levers, each pivoted at one end thereof to the frame and axle respectively, the free ends of said levers being apertured, a resilient member having convex faces interposed between said free ends, and a bolt passing through said resilient member intermediate the ends thereof and through said apertured ends, said bolt having means thereon for holding said free ends in predetermined spaced relation to clamp said resilient member therebetween; whereby the levers at their pivoted ends follow the relative displacements of the frame and axle and at their free ends they alternately compress spaced portions of the interposed resilient member to cause the oscillations of the frame relatively to the axle to be absorbed by said resilient member.

13. In combination with a vehicle frame and axle, a shock absorber comprising a pair of levers, each pivoted at one end thereof to the frame and axle respectively, the free ends of said levers having curved faces, and a resilient member interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

14. In combination with a vehicle frame and axle, a shock absorber comprising a pair of levers, each pivoted at one end thereof to the frame and axle respectively, the free ends of said levers having curved faces, and a resilient member of varying cross-section interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

15. In combination with a vehicle frame and axle, a shock absorber comprising a pair of levers, each pivoted at one end thereof to the frame and axle respectively, the free ends of said levers having curved faces, and a resilient member having convex faces interposed between said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

16. In combination with a vehicle frame and axle, a shock absorber comprising a pair of levers, each pivoted at one end thereof to the frame and axle respectively, said levers converging toward their free ends and having portions thereof at their free ends in substantially parallel relation, and a resilient member interposed between and clamped in cooperative relation with said free ends; whereby the levers at their pivoted ends follow the relative displacements of the frame and axle and at their free ends they alternately compress spaced portions of the interposed resilient member to cause the oscillations of the frame relatively to the axle to be absorbed by said resilient member.

17. A shock absorber including two independent levers having angularly related ends, an unrestricted inherently compressible member interposed directly between the ends of the levers and compressible in relative angular movement of the levers in either direction, and means passing through the member and providing a fulcrum support for such lever ends in movement.

18. A shock absorber including two independent levers having angularly related ends, an inherently compressible member interposed directly between the ends of the levers and compressible in relative angular movement of the levers in either direction, and means passing through the member and providing a fulcrum support for such lever ends in movement, said means being adjustable longitudinally of said lever ends and said member to vary the fulcrum point of said lever ends.

19. A shock absorber including two independent elements movable toward and from each other in action, each of the elements having an end portion, with the relative end portions substantially parallel when the elements are in normal relation, the end portions having a fulcrum intermediate their lengths, whereby in response to movement of the elements in one direction those parts of the end portions on one side of the fulcrum are caused to approach each other and on movement of the elements in the opposite direction those parts of the end portions on the opposite sides of the fulcrum are caused to approach each other, and a compressible block interposed between the end portions and extending on both sides of the fulcrum point.

20. A shock absorber including two independent elements movable toward and from each other in action, each element having an angularly related end portion, the end portions being normally parallel and movable into divergent relation in movement of the elements in one direction and into convergent relation in movement of the elements in the opposite direction, and a compressible block interposed between the end portions and having a part thereof compressed under divergent relation of the end portions and another part thereof compressed under convergent relation of the end portions.

21. A shock absorber including two independent elements movable relatively in action, each element having an angularly related end portion, with such end portions in substantially parallel relation when the elements are at rest in normal position, said end portions moving in response to movement of the elements into divergent relation as the elements approach each other and convergent relation as the elements move from each other, and a block of rubber interposed between the end portions and having one end compressible when the end portions of the elements are divergent and the other end compressible when the end portions of the elements are convergent.

JEAN HENRY JALBERT.